(12) United States Patent
Li

(10) Patent No.: US 8,055,082 B2
(45) Date of Patent: Nov. 8, 2011

(54) PHOTO CLASSIFYING SYSTEM AND METHOD FOR DIGITAL PHOTO FRAME

(75) Inventor: Li-Juan Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 605 days.

(21) Appl. No.: 12/208,652

(22) Filed: Sep. 11, 2008

(65) Prior Publication Data

US 2009/0297047 A1 Dec. 3, 2009

(30) Foreign Application Priority Data

May 30, 2008 (CN) .............................. 200810301875

(51) Int. Cl.
*G06K 9/62* (2006.01)
(52) U.S. Cl. ........................ 382/224; 382/305
(58) Field of Classification Search .......... 382/224–228, 382/305–306, 325
See application file for complete search history.

(56) References Cited

U.S. PATENT DOCUMENTS

| | | | | | |
|---|---|---|---|---|---|
| 4,358,789 | A | * | 11/1982 | Confer | 348/441 |
| 7,430,015 | B2 | * | 9/2008 | Ohki | 348/459 |
| 2004/0036800 | A1 | * | 2/2004 | Ohki | 348/459 |
| 2008/0114246 | A1 | * | 5/2008 | Randall et al. | 600/447 |
| 2008/0136796 | A1 | * | 6/2008 | Dowling | 345/204 |
| 2008/0151112 | A1 | * | 6/2008 | Basile et al. | 348/500 |
| 2008/0212881 | A1 | * | 9/2008 | Hirakawa | 382/224 |

* cited by examiner

*Primary Examiner* — Manav Seth
(74) *Attorney, Agent, or Firm* — Altis Law Group, Inc.

(57) ABSTRACT

A photo classifying method for digital photo frame (DPF), includes recording a creating date of the photo and a current date of the DPF, and presetting at least one reference browsing rate, calculating the total browsing time of the photo, calculating the browsing rate of the photo by dividing the difference between the creating date of the photo and the current date of the DPF into the total browsing time of the photo, comparing the calculated result of the browsing rate of the photo with the reference browsing rate and classifying the photo into a corresponding photo grade according to the compared result, and recording the photo grade in a property information of the photo.

14 Claims, 2 Drawing Sheets

PHOTO CLASSIFYING SYSTEM AND METHOD FOR DIGITAL PHOTO FRAME

BACKGROUND

1. Technical Field

The present invention relates to classifying systems and methods and, more particularly, to a classifying system and method for photos stored in a digital photo frame (DPF).

2. General Background

A digital photo frame (DPF) may be used for conveniently browsing photos. However, when many photos are stored in a DPF, it may become difficult and inconvenient to locate desired photos. One arrangement includes arranging photos according to creation time or name before browsing. However, such arrangement does not provide users with the capability to quickly locate the desired photos.

What is needed, therefore, is a method for helping users to conveniently classify and manage photos stored in a DPF.

SUMMARY

A photo classifying method for digital photo frame (DPF), includes the steps of: recording a creating date of the photo, a current date of the DPF, and presetting at least one browsing rate; calculating the total browsing time of the photo; calculating the browsing rate of the photo by dividing the difference between the creating date of the photo and the current date of the DPF into the total browsing time of the photo; comparing the calculated result of the browsing rate of the photo with the browsing rate and classifying the photo into a corresponding photo grade according to the compared result; and recording the photo grade in a property information of the photo.

DETAILED DESCRIPTION OF THE EMBODIMENTS

Figure 1:
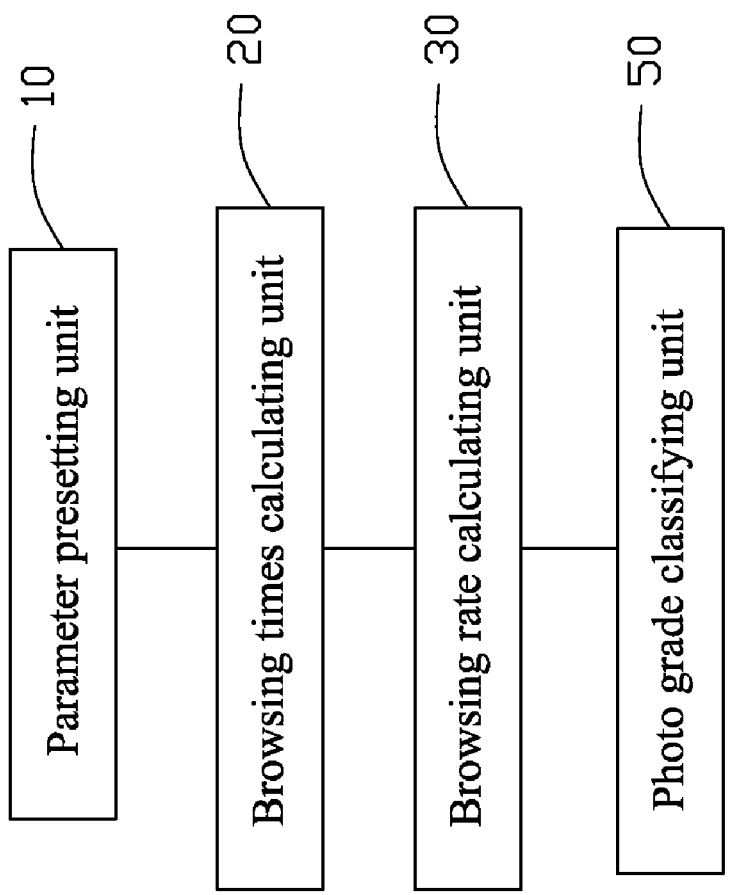
FIG. 1 is a block diagram of one embodiment of the photo classifying system for a digital photo frame.

FIG. 1 is a block diagram of one embodiment of the photo classifying system to conveniently manage a plurality of photos stored in a digital photo frame (DPF). The photo classifying system includes a parameter presetting unit 10, a browsing time calculating unit 20, a browsing rate calculating unit 30, and a photo grade classifying unit 50 configured to classify photos into different grades according to calculated browsing rates. The parameter presetting unit 10 is configured to record and set a plurality of parameters in the DPF. The parameters includes creation dates T1 of the photos, current date T2 of the DPF system, current browsing time F of the photos, a first reference browsing rate M and a second reference browsing rate N for identifying the grades of the photos. M is a greater rate than N. When each of the photos is viewed, a numerical value of a current browsing time F increases by one.

Figure 2:
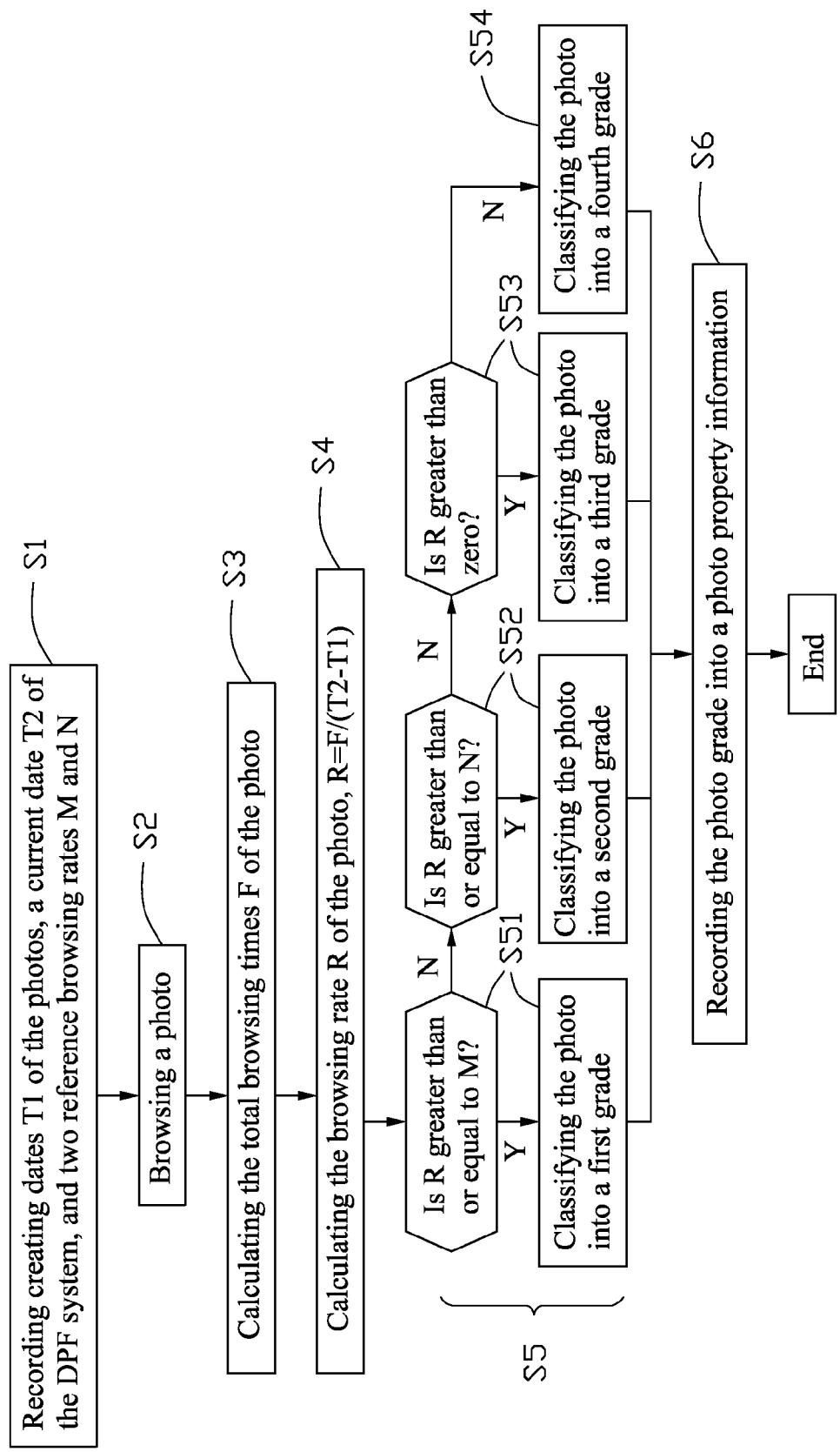
FIG. 2 is a flow chart of one embodiment of the photo classifying method for a digital photo frame.

FIG. 2 is an embodiment of a photo classifying method. Detailed steps are described as follows. Depending on the embodiment, certain of the steps described below may be removed, others may be added, and the sequence of steps may be altered.

S1: Recording the creation date T1 of each photo, the current date T2 of the DPF system, and the two reference browsing rates M and N in the DPF.

S2: Browsing a photo.

S3: Initiating the browsing time calculating unit 20 to calculate the current browsing time F of the photo when a photo is selected; the numerical value of current browsing time F of the photo increases by one.

S4: Calculating the browsing rate R via the browsing rate calculating unit 30; the browsing rate R of the photo is equal to the current browsing time F of the photo divided by the time difference value between T1 and T2, $R=F/(T2-T1)$.

S5: Comparing the calculated browsing rate R to the reference browsing rates M and N preset in the DPF; classifying the photos into four grades A, B, C, and D according to the comparison. The grades A, B, C, and D are arranged in a descending order of the browsing rate of the photos.

The step S5 further includes four steps S51-S54 for classifying the photos.

S51: If the browsing rate R of the photo is greater than or equal to the first reference browsing rate M, classifying the photo into a first grade A, indicating that the photo is frequently browsed.

S52: If the browsing rate R of the photo is greater than or equal to the second reference browsing rate N and is lower than the first reference browsing rate M, classifying the photo into a second grade B, indicating that the photo is not as frequently browsed as grade A photos.

S53: If the browsing rate R of the photo is greater than zero and less than the second reference browsing rate N, classifying the photo into a third grade C, indicating that the photo is not frequently browsed.

S54: If the browsing rate R of the photo is equal to zero, classifying the photo into a fourth grade D, indicating that the photo is never browsed.

S6: After the photo is classified and graded, recording the grade of the photo in the property information in an identifiable manner, for example, the grade of the photo can be identified in the property information with stars; four stars represents grade A, three stars represents grade B, two stars represents grade C, and one star represents grade D; arranging the photos according to the grades, so the user can conveniently locate the desired photos.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A photo classifying method for managing a plurality of photos stored in a digital photo frame (DPF), the method comprising:

recording a creation date of each photo, a current date of the DPF, and presetting at least one reference browsing rate by the DPF;

calculating a total browsing time of each photo;

calculating a browsing rate of each photo by dividing the total browsing time of each photo by the difference between a creation date of each photo and a current date of the DPF;

comparing the browsing rate of each photo with the at least one reference browsing rate and classifying each photo with a corresponding photo grade according to the comparison; and recording the corresponding photo grade in a property information of each photo.

2. The method as described in claim 1, wherein the at least one reference browsing rate comprises a first reference browsing rate and a second reference browsing rate are preset in the DPF, the first reference browsing rate is greater than the second reference browsing rate.

3. The method as described in claim 2, wherein for each photo, if the current browsing rate is greater than or equal to the first reference browsing rate, the corresponding photo grade is a first grade.

4. The method as described in claim 2, wherein for each photo, if the current browsing rate is greater than or equal to the second reference browsing rate and lower than the first reference browsing rate, the corresponding photo grade is a second grade.

5. The method as described in claim 2, wherein for each photo, if the current browsing rate is greater than zero and lower than the second reference browsing rate, the corresponding photo grade is a third grade.

6. The method as described in claim 2, wherein for each photo, if the current browsing rate is equal to zero, the corresponding photo grade is a fourth grade.

7. The method as described in claim 1, wherein the property information of each photo comprises a term for identifying the photo grade.

8. A photo classifying system for managing a plurality of photos stored in a digital photo frame (DPF), the system comprising:

a parameter presetting unit configured to set and record a creation date of each photo, a current date of the DPF, and at least one reference browsing rate;

a browsing time calculating unit for calculating total browsing time of each photo;

a browsing rate calculating unit configured to calculate a browsing rate of each photo by dividing the total browsing time of each photo by the difference between the creation date of each photo and the current date of the DPF; and a photo grade classifying unit configured to classify each photo with a corresponding photo grade by comparing the calculated browsing rate with the at least one reference browsing rate.

9. The system as described in claim 8, wherein the at least one reference browsing rate comprises a first reference browsing rate preset in the DPF and a second reference browsing rate preset in the DPF, the first reference browsing rate is greater than the second reference browsing rate.

10. The system as described in claim 9, wherein for each photo, if the current browsing rate is greater than the first reference browsing rate, the corresponding photo grade is a first grade.

11. The system as described in claim 9, wherein for each photo, if the current browsing rate is greater than or equal to the second reference browsing rate and lower than the first reference browsing rate, the corresponding photo grade is a second grade.

12. The system as described in claim 9, wherein for each photo, if the current browsing rate is greater than zero and lower than the second reference browsing rate, the corresponding photo grade is a third grade.

13. The system as described in claim 9, wherein for each photo, if the current browsing rate is equal to zero, the corresponding photo grade is a fourth grade.

14. The system as described in claim 8, wherein a term is added in a photo property information for identifying the photo grade.

* * * * *